United States Patent [19]
Dahl

[11] 3,757,630
[45] Sept. 11, 1973

[54] FIXED FORCE LEVEL BOLT

[76] Inventor: Norman C. Dahl, 78 Irving Pl., New York, N.Y. 10003

[22] Filed: Feb. 3, 1972

[21] Appl. No.: 223,259

[52] U.S. Cl. ................................. 85/62, 10/27 R
[51] Int. Cl. ............................................ F16b 31/02
[58] Field of Search ..................... 85/62, 61, 9 R; 151/38, 37; 10/27 R

[56] References Cited
UNITED STATES PATENTS

| | | | |
|---|---|---|---|
| 2,824,481 | 2/1958 | Johnson | 85/62 |
| 3,066,568 | 12/1962 | Armour | 85/9 R |
| 3,306,154 | 2/1967 | Bailey | 85/62 |
| 3,383,974 | 5/1968 | Dahl | 85/62 |
| 3,431,812 | 3/1969 | Dahl | 85/62 |
| 3,474,701 | 10/1969 | Setzler | 85/62 |

*Primary Examiner*—Marion Parsons, Jr.
*Attorney*—Richard P. Crowley et al.

[57] ABSTRACT

A bolt including a bolt head which bolt head is characterized by a depending ring-like extension therefrom. The extension has an inner surface spaced apart from the outer surface of the bolt to define a cylindrical radial clearance therebetween. An annular external groove is formed in the outer peripheral wrenching surface of the bolt head extension to define an annular section which plastically deforms radially inward when a predetermined force acts on the bolt with the resultant reduction of the axial width of the external groove.

11 Claims, 6 Drawing Figures

3,757,630

FIXED FORCE LEVEL BOLT

BACKGROUND OF THE INVENTION

The requirements of modern technology are making it increasingly important that bolts be tightened accurately so that they carry the force for which they are designed. The usual way in which a given design bolt force is attained is to apply a specified torque to the bolt. This method gives satisfactorily accurate bolt forces when the friction conditions are known in advance with sufficient accuracy so that the correct torque can be specified. Unfortunately, in most situations the friction conditions are not known with any numerical certainty and even when the average conditions are known the friction varies from one bolt to the next due to such factors as the smoothness of the machined threads, rusting of the bolt or nut or the residual lubrication on the threads. Thus, the torque method of bolting gives unpredictable and variable results; and, further, once a bolt has been tightened by the use of a specified torque there is no way of determining whether the bolt actually carries the design force.

My U.S. Pat. No. 3,383,974, issued May 21, 1968, sets forth a design principle which can be incorporated either in the head of a bolt or in a nut and operates such that under all conditions of friction a predetermined design force can be produced in the bolt and when this force is produced an easily recognizable permanent visual signal is produced simultaneously.

My U.S. Pat. No. 3,431,812, issued Mar. 11, 1969, hereby incorporated by reference in this application, sets forth a different design priciple incorporated in a nut and which also operates such that under all conditions of friction a predetermined design force can be produced in the bolt and when this force is produced an easily recognizable permanent visual signal is produced simultaneously by the nut.

SUMMARY OF THE INVENTION

This invention is directed to a fastening member and a method of making the same. The invention in one embodiment includes a method of making a fastening member from a plurality of separately formed parts and incorporating in the fastening member the design principles set forth in my U.S. Pat. No. 3,431,812.

This invention more particularly incorporates the design principle of my U.S. Pat. No. 3,431,812 in the head of the bolt such that when the bolt is tightened the bolt head operates such that under all conditions of friction a predetermined design force can be produced in the bolt and when this force is produced an easily recognizable permanent visual signal is produced simultaneously by the bolt head. The invention relates to the design which the bolt head must have when constructed as an integral piece and, additionally, to the forming of the bolt head in multiple parts and then joining the parts to form a one-piece bolt head identical in form to the integral bolt head.

In my invention there is an extension of the bolt head along the bolt but with a cylindrical radial clearance space between the bolt surface and the extension of the bolt head such that the extension has an internal cylindrical surface. The extension terminates in an annular surface or face which is made conical such that the outer edge of the face first contacts the abutting surface. An external disc-shaped annular groove of small width is formed in the external peripheral wrenching surface of the extension of the bolt head. The radial thickness between the bottom of the external annular groove and the internal cylindrical surface of the extension is made such that when the bolt carries a specified axial force plastic deformation occurs in a wedge-shaped section between the bottom of the groove and the internal cylindrical surface with the result that the bolt head material in this section moves radially inward and allows the external annular groove to become thinner. The axial width of the external annular groove is preferably less than approximately twice the radial thickness to ensure that the desired radially inward plastic deformation occurs.

Flowable incompressible material is put in the external groove and this material is extruded when the groove decreases in width to signal that the specified bolt force has been reached. The flowable material can be made electrically conducting so that the extruding material closes an electric circuit by contacting a circuit terminal in the wall of the wrench which applies torque to the bolt head, as described in my U.S. Pat. No. 3,383,961, issued May 21, 1968. The resulting electrical signal could be used in various ways, such as to turn on a light on a hand wrench or to shut off a power wrench.

As explained in my U.S. Pat. No. 3,431,812, the conical nature of the annular face of the bolt head extension is provided so that there will be substantially uniform contact and bearing pressure between the extension face and its abutting bearing surface when the bolt carries its design force.

The external annular groove is formed in the external wrenching surface of the bolt head such that when the bolt is being tightened there is preferably torque applied to the bolt head wrenching surface below as well as above the external groove and thus there is substantially no torque acting on the yielding section located between the bottom of the external groove and the internal cylindrical surface. As a result, the stresses in the yielding section are primarily due only to the effect of the axial bolt force and therefore the onset of plastic deformation is controlled mainly by the magnitude of the bolt force and is only very weakly influenced by large variations in friction conditions.

As is clear from the foregoing description, the plastic deformation process described in U.S. Pat. No. 3,431,812 requires the presence of an internal surface so that the wedge-shaped yielding section can move radially inward and thereby allow the external annular groove to become thinner. The design concept of U.S. Pat. No. 3,431,812 is now applicable to the head of a bolt in that an internal surface is provided by extending the bolt head along the bolt with a cylindrical radial clearance space between the bolt surface and the bolt head extension.

The proportions of this cylindrical space in a typical bolt head make it extremely difficult, if not impossible, to produce by forging. Also, it is relatively expensive to produce by machining. To overcome these cost limitations, my invention includes a method by which the cylindrical clearance space can be produced at economical cost by making the bolt head of two parts, one formed integral with the bolt and the other formed separately, and pressing these two parts together to form a one-piece bolt head having the configuration described above. Consequently, the preferred embodiment of my invention comprises a bolt made of two parts of such shapes that when the two parts are pressed together to form a single piece the bolt head incorporates the inner cylindrical surface and the external annular groove whose cooperative interaction during plastic deformation is the basis for the physical behavior of the bolt head which produces accurate bolt forces under all conditions of friction.

The preferred embodiment of my invention, therefore, includes a bolt of ductile material, said bolt having a bolt head integrally secured thereto, a separately formed part secured to the bolt head, and having an inner surface spaced apart from the outer surface of the bolt to define therewith a radial clearance, an external radially directed annular groove formed on the outer peripheral wall of the assembled bolt, said groove being less in axial width than twice the radial thickness between the bottom of the external groove and the inner surface of the cylindrical extension thereby defining an annular section which plastically deforms radially inward with an essentially wedge-shaped cross section when a predetermined force acts on the bolt with the resultant reduction of the axial width of the external groove.

The method of my invention includes a method of forming a bolt which comprises forming a bolt including a bolt head, forming a separate part, and securing said part at one end thereof through the bolt head, said part having an inner surface spaced apart from the outer surface of the bolt to define therewith a radial clearance, and joining said separate part to the bolt head whereby a composite bolt is formed and an external annular groove is defined on the wrenching surface of the joined bolt and separate part, said groove extending radially inward and adapted to close when a predetermined load acts on said bolt.

DESCRIPTION OF THE PREFERRED EMBODIMENT

Figure 1:
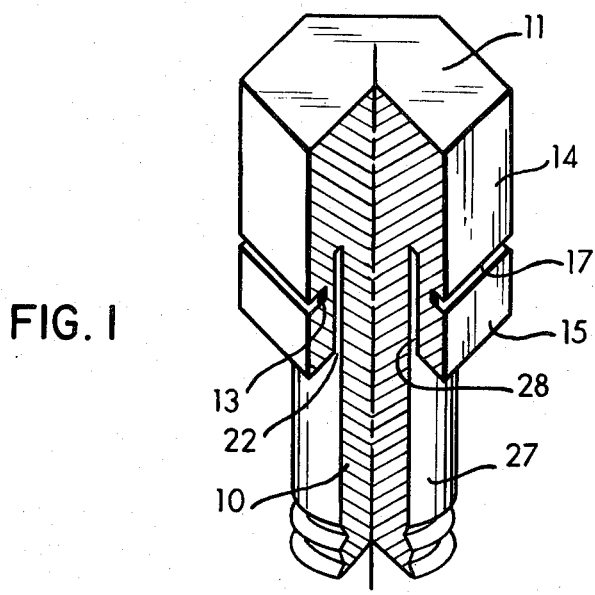
FIG. 1 is an isometric sectional view of a bolt with an integrally formed head.

In FIG. 1 is shown bolt 10 with integrally formed head 11 having external peripheral wrenching surface 14. The bolt head 11 has a ring-like extension 15 along the bolt with cylindrical radial clearance space 22 between the bolt surface 27 and the internal cylindrical surface 28 of the extension 15. An external radially directed annular groove 17 is formed in the outer wrenching surface 14 of the extension 15 and a flowable incompressible material 13 partially fills the groove 17.

Figure 2:
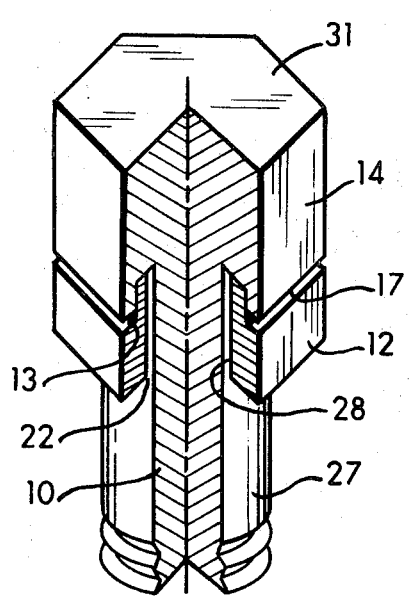
FIG. 2 is an isometric sectional view of a bolt with a head assembled from two parts, one formed integrally with the bolt and the other formed separately.
Figure 3:
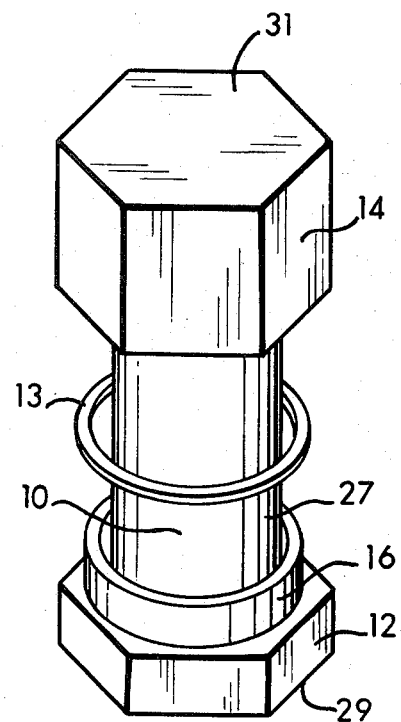
FIG. 3 is an exploded isometric view of the bolt of FIG. 2.
Figure 4:
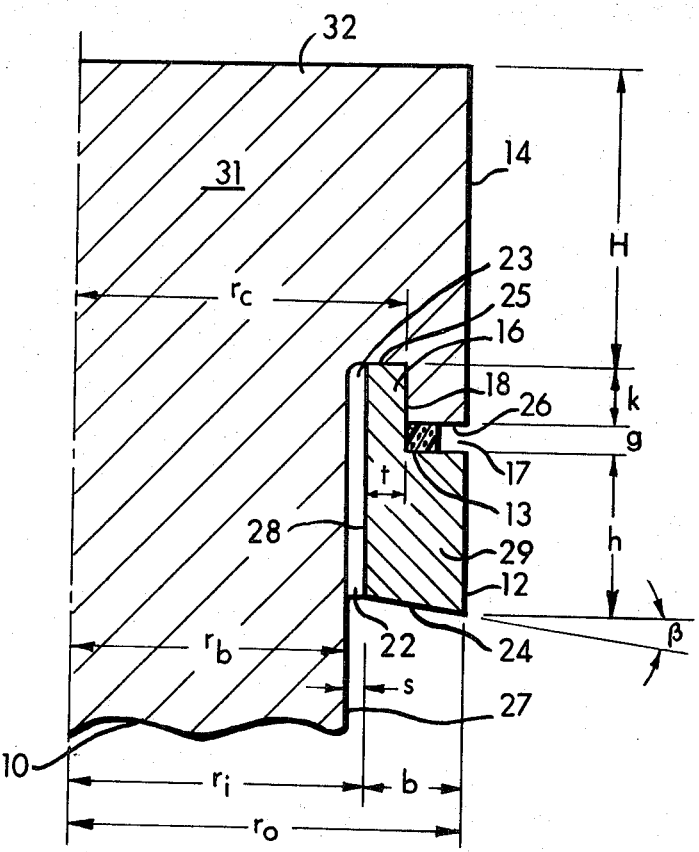
FIG. 4 is an enlarged sectional view of the bolt head of FIG. 2.
Figure 5:
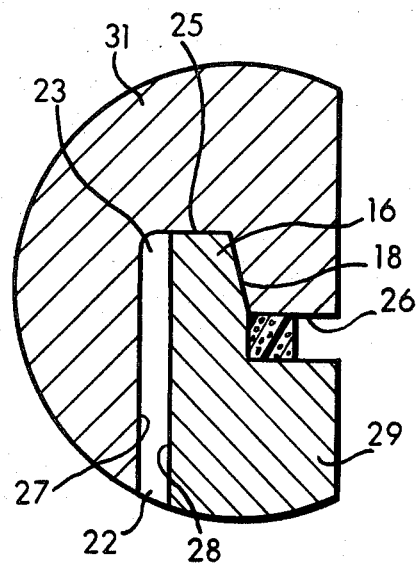
FIG. 5 is an alternative design for the manner in which the two parts of FIG. 4 are mated together.

In FIGS. 2, 3, and 4 is shown the preferred embodiment. Integrally with the bolt there is formed the bolt head 31 of axial height $H + k$ in the bottom surface 26 of which, adjacent to the bolt surface 27, there is formed an axially directed cylindrical groove of axial height k and outer radius $r_c$. There is separately formed a force ring 12 with an internal cylindrical surface 28 of radius $r_i$ and consisting of an upper portion 16 which is a cylindrical sleeve of axial height $g + k$ and outer surface radius $r_i + t$ and a lower portion 29 of axial height $h$ whose outer surface has the shape of the wrenching surface 14 and which terminates in the annular face 24 of conical shape with cone angle $\beta$. The complete bolt head is assembled by inserting the sleeve 16 of force ring 12 into the cylindrical groove 23 of integral bolt head 31 until the two parts are in firm bearing contact along the line 25, and the outer radius $r_c$ of the groove 23 is dimensioned relative to the radius $r_i + t$ of the outer cylindrical surface of the sleeve 16 such that axial force is equired to assemble the two parts together to ensure that the parts remain in proper contact during subsequent handling and use. As a convenience in assembling the two parts of the bolt head it may be desirable to make the mating surface 18 of a slightly tapered shape as shown in exaggerated form in FIG. 5. When the two parts are assembled the complete bolt head incorporates a cylindrical radial clearance space 22 of radial thickness $s$ and axial height $h + g + k$ and an external annular groove 17 of axial width $g$ and of inner radius $r_i + t$. As illustrated in FIG. 3, the flowable incompressible material 13 can be fabricated in the form of a ring which is positioned between the integral bolt head 31 and the force ring 12 so that in the assembled bolt head the flowable material partially fills the annular groove 17.

Figure 6:
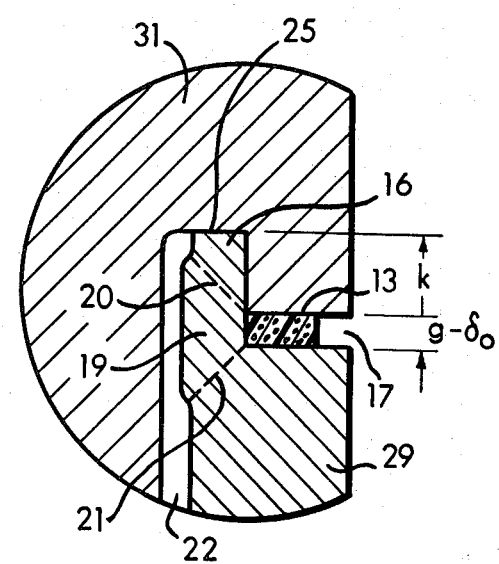
FIG. 6 shows how the wedge-shaped yielding section moves radially inward into the radial clearance space when the design force is produced in the bolt.

As illustrated in FIG. 6, when the design force exists in the bolt there develops conical shear regions 20 and 21 emanating from the inner corners of the annular groove 17, and the wedge-shaped yielding section 19 between the conical shear regions moves radially inward and allows the annular groove to become thinner. The width $g$ of the external groove 17 must be made less than twice the radial thickness $t$ of the yielding section 19 to ensure that the desired type of plastic deformation shown in FIG. 6 will take place and typically the width $g$ will be made some fraction of the thickness $t$ to limit the amount of plastic deformation that can take place, as a protection against overloads which may be placed on the bolt.

Theory shows and experiment confirms that when the bolt head plastically deforms such that the axial width of the groove 17 decreases by a distance $\delta_o$, as illustrated in FIG. 6, the yielding section 19 moves radially inward approximately a distance $\delta_o/2$. Thus, the radial clearance distance s must be made equal to or larger than $g/2$ if it is desired to completely close the groove 17 during the tightening of the bolt to produce the design bolt force.

As in all manufacturing operations, there will be some variation in the performance of the manufactured bolts due to variations in material properties and manufacturing operations. For applications where the bolt force must be produced within an unusually close tolerance limit it will·be possible to select bolts which are certain to meet this requirement by a simple test of all bolts after manufacture. In this test the bolt head will be supported on its bottom annular face 24 (FIG. 4) and will be loaded on its top face 32 by a device which is capable of creating a specified permanent decrease $\delta_o$ (less than $g$) in the width of the annular groove 17, as illustrated in FIG. 6, and of simultaneously measuring the force required to produce this deformation. Those bolts for which the measured force lies outside the tolerance limit would be used for other applications.

Following the design procedure outlined in U.S. Pat. No. 3,431,812 the bolt head would be designed as follows:

A selection is made for the gap width $g$ of the external annular groove 17.

A decision is made on the radius $r_i$ of the internal cylindrical surface 28 depending on whether or not it is desired to completely close the groove 17 during tightening of the bolt.

The raidal thickness $t$ of the yeilding section 19 is calculated from $$2\pi t (r_i + t/2)(1.20\ Y) < F < 2\pi t (r_i + t/2)(1.25\ Y)$$

where F is the design bolt force and Y is the yield stress of the material of which the force ring 12 is manufactured.

In order that the upper conical shear region 20 be entirely contained within the cylindrical sleeve 16, and thereby not be prevented from developing by the integral portion 31 of the bolt head, it will be necessary for the axial height $k$ of the cylindrical groove 23 to be made at least equal to the thickness $t$.

For a bolt head with a generally straight outer peripheral wall surface the distance $h$ is made at least equal to $$h = \sqrt{7.5\ (b - t)\ F/4\pi b Y}$$

and the cone angle $\beta$ is made at least equal to $$\beta = 12\ Y\ (r_i + b/2)/7.5\ E\ h$$

where E is the modulus of elasticity of the force ring material.

A value is selected for the outer radius $r_c$ of the cylindrical groove 23 such that the proper press fit is achieved when the two parts of the bolt head are assembled.

My invention describes the formation of bolts in a preferred invention by forming separate parts of the bolt and then assembling the parts so formed to complete the composite bolt. Although described in reference to forming the bolt in two parts, the bolt may be formed, of course, from a plurality of parts. Further, conventional forging and/or casting techniques may be used as well as conventional pressing and/or other techniques to form the composite bolt assemblies.

Having described my invention, what I now claim is:

1. A bolt of ductile material which comprises:
   a. a first part which includes a bolt head integrally secured to said bolt, the bolt head having an outer wrenching surface, and includes a ring-like extension depending therefrom adjacent to said outer wrenching surface and defining an axially extending internally directed surface;
   b. a second separate part having an outer wrenching surface, with one end thereof engaging said internally directed surface and abuttingly secured to the extension of said bolt head and extending along said bolt, the other end thereof terminating in a bearing surface;
   c. said second part having an inner surface spaced apart from the outer surface of the bolt to define therewith a radial clearance; and
   d. an external radially directed annular groove defined by said outer wrenching surfaces, the external groove being less in axial width than twice the radial thickness between the bottom of the external groove and the inner surface thereby defining an annular section which plastically deforms radially inward with an essentially wedge-shaped cross section when a predetermined force acts on the bolt with resultant reduction of the axial width of the external groove.

2. The bolt of claim 1 wherein the second part has a sleeve extending therefrom, said sleeve received in mating relationship by the ring-like extension of the bolt head.

3. The bolt of claim 2 wherein the annular section which plastically deforms radially inward is disposed entirely within the sleeve of the second part.

4. The bolt of claim 1 wherein the wrenching surfaces of the first and second parts are of equal diameter.

5. The bolt of claim 1 wherein the other end of the second part terminates in a conical bearing face such that the outer edge of the face first contacts the abutting surface and of an angle at least equal to the rotation of said face when said predetermined bolt force acts on the bolt whereby a uniform bearing stress acts between said lower bearing face and said abutting surface.

6. The bolt of claim 4 wherein a flowable imcompressible material is disposed within said groove.

7. The bolt of claim 6 wherein the material is electrically conducting.

8. A bolt of ductile material which comprises:
   a first part including a bolt head integrally secured thereto, said bolt head having an outer wrenching surface, a cylindrical extension depending from said bolt head and having an inner surface spaced apart from the outer surface of the bolt;
   a second part comprising a force ring having an outer peripheral wrenching surface of substantially the same diameter as the bolt head and a sleeve extending therefrom, said sleeve having an inner and an outer surface, the outer surface of the sleeve engaging in abutting relationship the inner surface of the cylindrical extension, the inner surface of the sleeve spaced apart from the outer surface of the bolt to define a radial clearance therewith;
   an external radially directed annular groove formed on said outer wrenching surface by the bolt head and the force ring, the external groove being less in axial width than twice the radial thickness between the bottom of the external groove and the inner surface of the sleeve thereby defining an annular section which plastically deforms radially inward with an essentially wedge-shaped cross section when a predetermined force acts on the bolt with resultant reduction of the axial width of the external groove.

9. The bolt of claim 8 wherein the outer surface of the sleeve of the force ring and the inner surface of the cylindrical extension of the bolt head are tapered.

10. The bolt of claim 8 wherein a flowable imcompressible material is disposed within the external groove.

11. The bolt of claim 10 wherein the material is electrically conducting.

* * * * *